United States Patent
Shin et al.

(10) Patent No.: US 7,245,342 B2
(45) Date of Patent: Jul. 17, 2007

(54) ARRAY SUBSTRATE FOR LIQUID CRYSTAL DISPLAY DEVICE HAVING CONDUCTIVE PATTERNS AND FABRICATING METHOD THEREOF

(75) Inventors: Chul-Sang Shin, Chungcheongnam-do (KR); Gyo-Won Chin, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/314,239

(22) Filed: Dec. 9, 2002

(65) Prior Publication Data
US 2003/0122982 A1    Jul. 3, 2003

(30) Foreign Application Priority Data
Dec. 28, 2001    (KR) ...................... 10-2001-0087450

(51) Int. Cl.
*G02F 1/1345*    (2006.01)
(52) U.S. Cl. ...................................... 349/152; 349/123
(58) Field of Classification Search ......... 349/149–152
See application file for complete search history.

(56) References Cited

U.S. PATENT DOCUMENTS 5,929,948 A * 7/1999 Ohori et al. .................. 349/44
5,982,470 A * 11/1999 Nakahara et al. ............ 349/153
6,208,399 B1 * 3/2001 Ohta et al. ................... 349/139
6,249,333 B1 * 6/2001 Zhang et al. ................ 349/151
6,549,260 B1 * 4/2003 Shibahara .................... 349/155
6,803,976 B1 * 10/2004 Fujioka et al. ................ 349/54

FOREIGN PATENT DOCUMENTS

KR    1977-0048811    7/1997

* cited by examiner

*Primary Examiner*—David Nelms
*Assistant Examiner*—Richard H Kim
(74) *Attorney, Agent, or Firm*—McKenna Long & Aldridge LLP (57) ABSTRACT

An array substrate for a liquid crystal display device includes a gate line on a substrate having a display region and a non-display region, wherein the non-display region is about a periphery of the display region and the gate line includes a gate pad disposed in the non-display region at one end of the gate line, a data line crossing the gate line, wherein the data line includes a data pad disposed in the non-display region at one end of the data line, a thin film transistor connected to the gate line and the data line, a passivation layer over the gate line and the data line, a pixel electrode on the passivation layer in the display region, a first conductive pattern on the passivation layer in the non-display region and an orientation film on the first conductive pattern.

23 Claims, 12 Drawing Sheets

ARRAY SUBSTRATE FOR LIQUID CRYSTAL DISPLAY DEVICE HAVING CONDUCTIVE PATTERNS AND FABRICATING METHOD THEREOF

The present invention claims the benefit of the Korean Patent Application No. 2001-87450 filed in Korea on Dec. 28, 2001, which is hereby incorporated by reference in its entirety.

BACKGROUND OF THE INVENTION

1. Field of the Invention

The present invention relates to a liquid crystal display device, and more particularly, to an array substrate for a liquid crystal display device and a fabricating method thereof.

2. Discussion of the Related Art

Due to their small size, light weight, and low power consumption, flat panel display (FPD) devices have been the subject of much research in the field of information technology. Among the many types of FPD devices, liquid crystal display (LCD) devices having excellent color, resolution, and display characteristics are used in devices, such as notebook personal computers and desktop PCs. Generally, LCD devices include first and second electrode bearing substrates that are coupled to each other and spaced apart by a liquid crystal layer. LCD devices exploit optical anisotropy properties of the liquid crystal layer to display images. In particular, an electric field generated when a voltage is applied across the liquid crystal layer between an electrode of the first electrode bearing substrate and an electrode of the second electrode bearing substrate can selectively manipulate the light transmittance of the liquid crystal layer.

Among the various types of LCD devices, active matrix LCD (AM-LCD) devices are commonly used because of their high resolution and their superior ability to display moving images. In the AM-LCD device, pixel electrodes and a common electrode are formed on first and second substrates, respectively. The pixel electrodes each are respectively connected to a thin film transistor (TFT) and are disposed in a matrix. A vertical electric field generated between the pixel electrode and the common electrode drives the liquid crystal layer for the pixel in response to a data signal switched through the TFT. The AM-LCD device has excellent light transmittance and high aperture ratio in displaying moving images.

Figure 1:
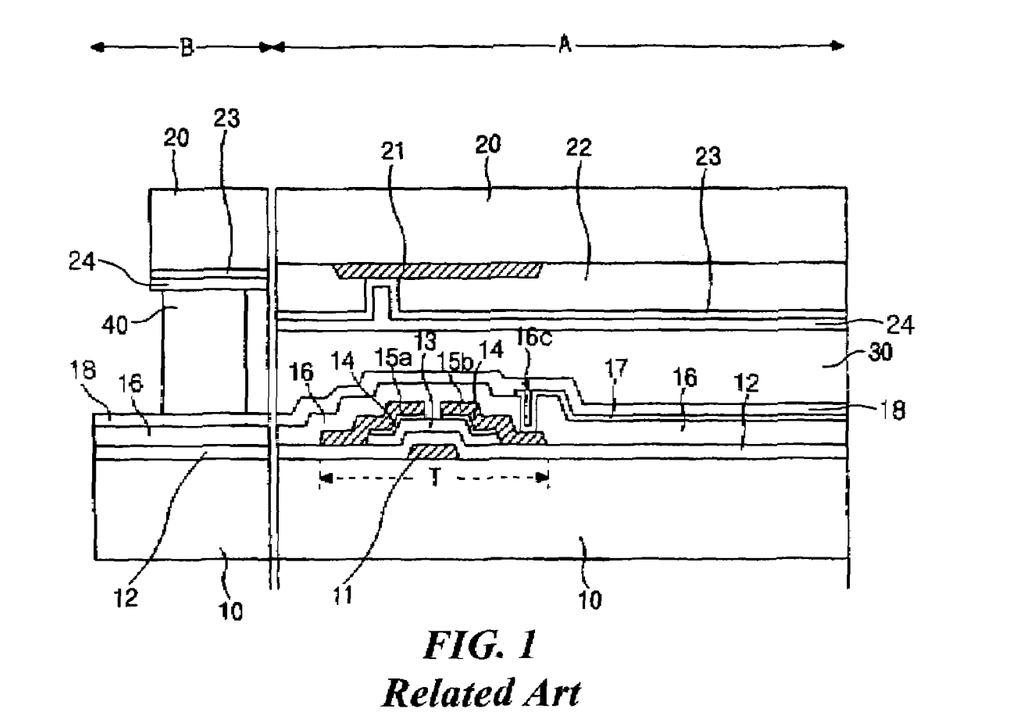
FIG. 1 is a schematic cross-sectional view of a related art liquid crystal display device.

FIG. 1 is a schematic cross-sectional view of a related art liquid crystal display device. As shown in FIG. 1, an LCD device has a first region "A" where images are displayed and a second region "B" where pads (not shown) connected to a driving circuit (not shown) are disposed. The driving circuit applies signals to the first region "A." In the first region "A," a gate electrode 11 of a conductive material, such as a metal, is formed on a first substrate 10. A gate insulating layer 12 of silicon nitride ($SiN_x$) or silicon oxide ($SiO_x$) covers the gate electrode 11. An active layer 13 of amorphous silicon is formed on the gate insulating layer 12 over the gate electrode 11. An ohmic contact layer 14 of impurity-doped amorphous silicon is formed on the active layer 13. Source and drain electrodes 15a and 15b of a conductive material, such as a metal, are formed on the ohmic contact layer 14. The source electrode 15a, drain electrodes 15b and gate electrode 11 are for connecting a TFT "T."

The gate electrode 11 and the source electrode 15a are connected to a gate line (not shown) and a data line (not shown), respectively. The gate line and the data line cross each other and pixel regions are defined between respective pairs of data lines and gate lines. A passivation layer 16 of silicon nitride ($SiN_x$), silicon oxide ($SiO_x$) or organic insulating material is formed on the source and drain electrodes 15a and 15b. The passivation layer 16 has a drain contact hole 16c exposing the drain electrode 15b. A pixel electrode 17 made of a transparent conductive material is formed on the passivation layer 16. The pixel electrode 17 is connected to the drain electrode 15b through the drain contact hole 16c. A first orientation film 18 is formed on the pixel electrode 17.

A second substrate 20 faces and is spaced apart from the first substrate 10. A black matrix 21 corresponding to the TFT "T" is formed on an inner surface of the second substrate 20. A color filter layer 22 is formed on the black matrix 21. The color filter layer 22 has red (R), green (G) and blue (B) colors that are alternately disposed. One color corresponds to one pixel region. A common electrode 23 mode of transparent conductive material is formed on the color filter layer 22. A second orientation film 24 is formed on the common electrode 23. A liquid crystal layer 30 is interposed between the first and second orientation films 18 and 24 that are made of an organic material including polyimide. The first and second orientation films 18 and 24 determine an initial alignment state of liquid crystal molecules.

The gate insulating layer 12, the passivation layer 16 and the first orientation film 18 extend into the second region "B" of the first substrate 10. The common electrode 23 and the second orientation film 24 extend into the second region "B" of the second substrate 20. Moreover, a seal pattern 40 is formed between the first and second orientation films 18 and 24 in the second region "B." The seal pattern 40 maintains a gap between the first substrate 10 and the second substrate 20, and prevents leakage of the injected liquid crystal material from the LCD device.

Recently, an organic material with a low dielectric constant has been used as a passivation layer in LCD devices to increase the aperture ratio and/or the resolution of an LCD display. For example, photo-acryl is an organic material with a low dielectric constant that has been used. However, the polyimide used for the orientation films has poor adhesion to photo-acryl. Thus, the orientation films of polyimide curl up or peel away in the pad region of the LCD device where the seal pattern attaches to the orientation film to couple the substrates of the LCD device together. This inferiority will be illustrated in FIGS. 2 and 3 in detail.

Figure 2:
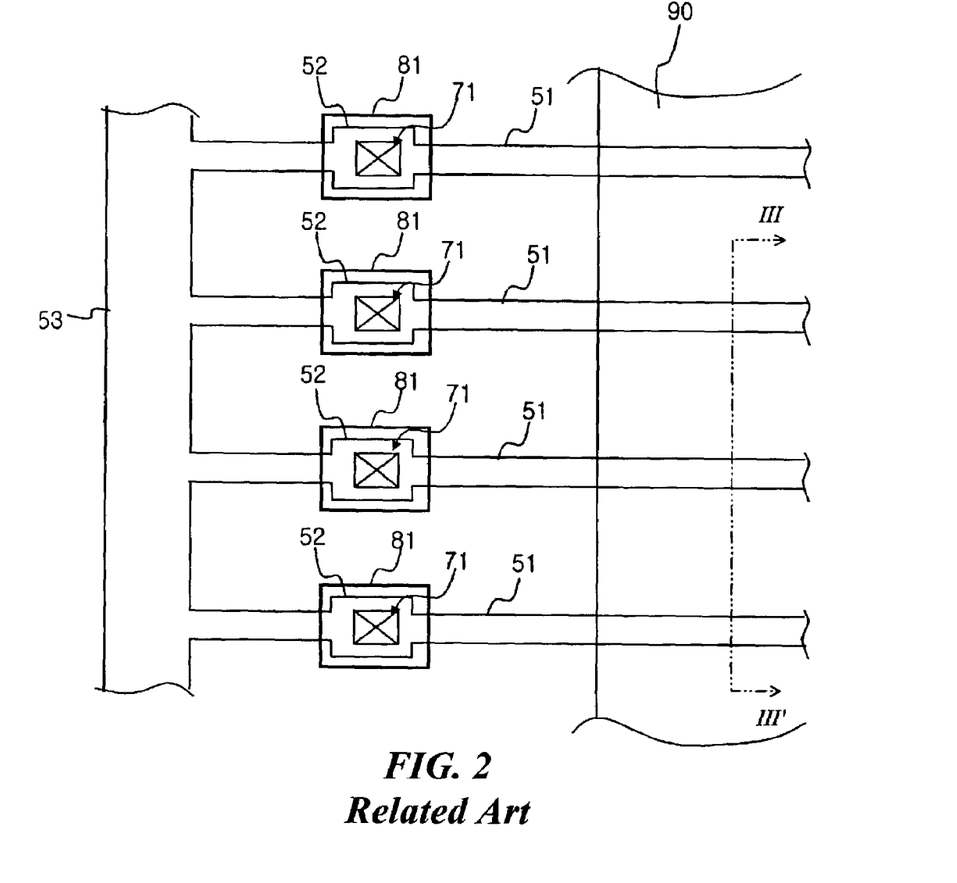
FIG. 2 is a schematic plan view of an array substrate for a related art liquid crystal display device.
Figure 3:
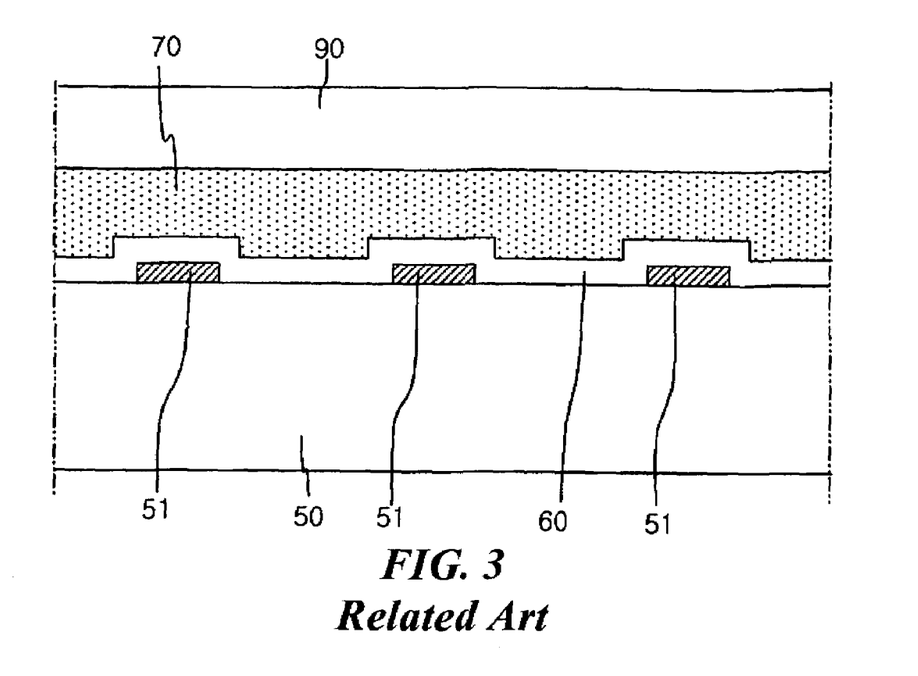
FIG. 3 is a schematic cross-sectional view taken along the line III-III' of FIG. 2.

FIG. 2 is a schematic plan view of a portion of an array substrate for a related art liquid crystal display device, and FIG. 3 is a schematic cross-sectional view taken along a line III-III' of FIG. 2. FIG. 2 shows a portion of an array substrate where a gate line and a gate pad are disposed.

As shown in FIGS. 2 and 3, gate lines 51 of a conductive material, such as a metal, are formed on a substrate along a first direction. One end of each gate line 51 is connected to a shorting bar 53, as shown in FIG. 2. Each gate line 51 has a gate pad 52 for applying a signal. The shorting bar 53 is made of the same material as the gate line 51 and extends along a second direction substantially perpendicular to the first direction. A gate insulating layer 60 is formed on the gate lines 51. A passivation layer 70 of an organic material, such as photo-acryl, is formed on the gate insulating layer 60. The shorting bar 53 is formed below the passivation layer 70. A gate pad contact hole 71 exposing the gate pad 52 is formed in the passivation layer 70. A gate pad terminal 81 made of a transparent conductive material is formed on the passivation layer 70 and electrically connected to the gate pad 52 through the gate pad contact hole 71. The gate pad terminal 81 is simultaneously formed with a pixel electrode (not shown). An orientation film 90 made of polyimide is then formed on the gate pad terminal 81 and the passivation layer 70.

The adhesion between the passivation layer 70 and the orientation film 90 is poor. Thus, a defect resulting from the poor adhesion between the passivation layer 70 and the orientation film 90 will occur. More specifically, the orientation film 90 will curl up or peel away from the passivation layer, especially in the region of the LCD device where the seal pattern attaches to the orientation film to couple the substrates of the LCD device.

SUMMARY OF THE INVENTION

Accordingly, the present invention is directed to an array substrate for a liquid crystal display device that substantially obviates one or more of the problems due to limitations and disadvantages of the related art.

An object of the present invention is to provide an array substrate for a liquid crystal display device and a fabricating method thereof in which adhesion of an orientation film is improved.

Another object of the present invention is to provide an array substrate for a liquid crystal display device and a fabricating method thereof in which adhesion of an orientation film is improved without creating signal delay due to a parasitic capacitance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a gate line on a substrate having a display region and a non-display region, wherein the non-display region is about a periphery of the display region and the gate line includes a gate pad disposed in the non-display region at one end of the gate line, a data line crossing the gate line, wherein the data line includes a data pad disposed in the non-display region at one end of the data line, a thin film transistor connected to the gate line and the data line, a passivation layer over the gate line and the data line, a pixel electrode on the passivation layer in the display region, a first conductive pattern on the passivation layer in the non-display region and an orientation film on the first conductive pattern.

In another aspect, a fabricating method of an array substrate for a liquid crystal display device includes forming a gate line on a substrate having a display region and a non-display region, wherein the non-display region is about a periphery of the display region and the gate line includes a gate pad disposed in the non-display region at one end of the gate line, forming a data line crossing the gate line, wherein the data line includes a data pad disposed in the non-display region at one end of the data line, forming a thin film transistor connected to the gate line and the data line, forming a passivation layer over the gate line and the data line, forming a pixel electrode on the passivation layer in the display region, forming a first conductive pattern on the passivation layer in the non-display region and forming an orientation film on the first conductive pattern.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
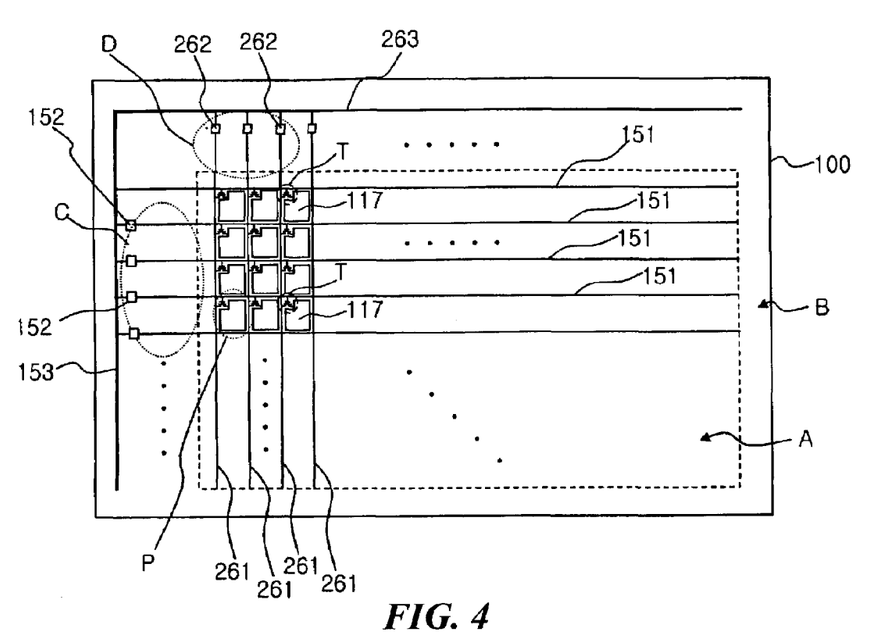
FIG. 4 is a schematic plan view of an array substrate for a liquid crystal display device according to an exemplary embodiment of the present invention.

FIG. 4 is a schematic plan view of an array substrate for a liquid crystal display device according to an exemplary embodiment of the present invention. As shown in FIG. 4, an array substrate 100 has a first region "A" where images are displayed and a second region "B" that is about the periphery of the first region "A." In the first region "A," gate lines 151 and data lines 261 cross each other. A pixel region "P" is defined between respective pairs of data lines and gate lines. A thin film transistor (TFT) "T" functioning as a switching element and having a gate connected to the gate line 151 is formed in each pixel region "P." A data line 261 and a pixel electrode 117 are connected respectively to the source and drain of a TFT "T" formed in each pixel region. In the second region "B," the gate lines 151 and the data lines 261 respectively have gate pads 152 and data pads 262 for applying signals. Moreover, a gate shorting bar 153 and a data shorting bar 263 are connected to ends of the gate lines 151 and the data lines 261, respectively. The gate shorting bar 153 and the data shorting bar 263 prevent damage to the TFTs in the first region "A" from the static electricity generated during subsequent fabrication processes. The gate shorting bar 153 and the data shorting bar 263 can also be used for testing the TFTs. Prior to use of the LCD device as a display, the gate shorting bar 153 and data shorting bar are cut out.

Figure 5:
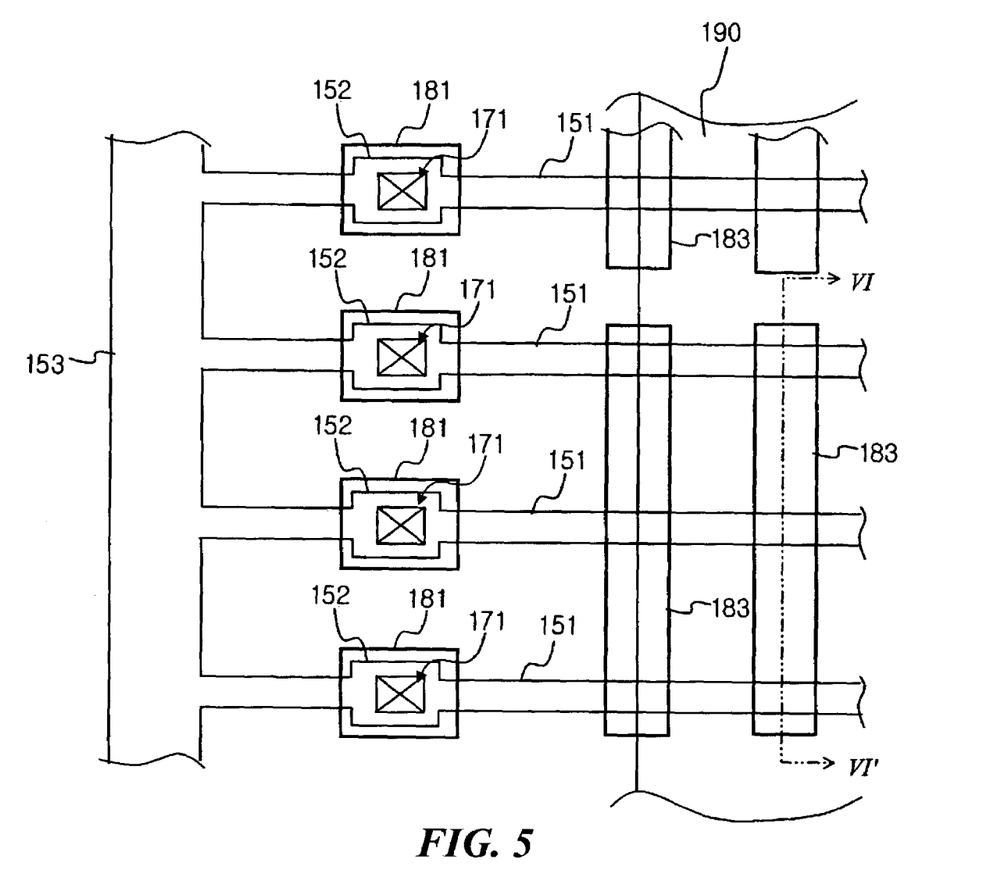
FIG. 5 is a schematic magnified plan view of the portion "C" in FIG. 4 according to an exemplary embodiment of the present invention.
Figure 6:
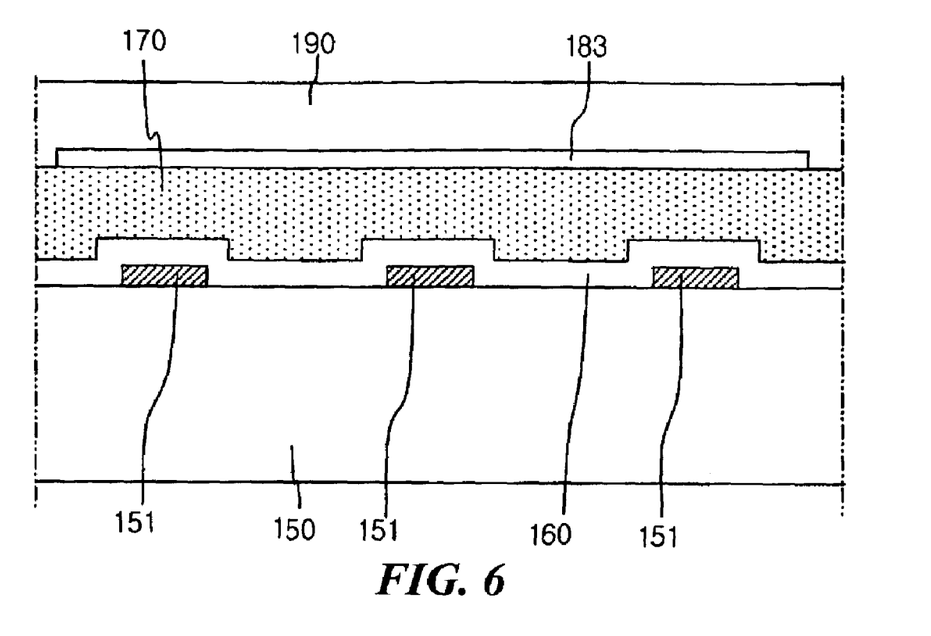
FIG. 6 is a schematic cross-sectional view taken along the line VI-VI' of FIG. 5.

FIG. 5 is a schematic magnified plan view of the portion "C" in FIG. 4 according to an exemplary embodiment of the present invention, and FIG. 6 is a schematic cross-sectional view taken along a line VI-VI' of FIG. 5.

As shown in FIGS. 5 and 6, gate lines 151 made of a conductive material, such as a metal, are formed on a substrate 150 along a first direction. One end of each gate line 151 is connected to a shorting bar 153. Adjacent to the end of each gate line 151 is a gate pad 152 for applying a signal. The shorting bar 153 is made of the same material as the gate line 151 and extends along a second direction substantially perpendicular to the first direction. A gate insulating layer 160 is formed on the gate lines 151. A passivation layer 170 made of an organic material, such as photo-acryl, is formed on the gate insulating layer 160. The shorting bar 153 is formed below the passivation layer 170. A gate pad contact hole 171 exposing the gate pad 152 is formed in the passivation layer 170. A gate pad terminal 181 made of a transparent conductive material is formed on the passivation layer 170 and electrically connected to the gate pad 152 through the gate pad contact hole 171. A first conductive pattern 183 made of a transparent conductive material is formed on the passivation layer 170 along the second direction adjacent to the gate pads 152. The first conductive pattern 183 crosses a plurality of the gate lines 151, which are a subset of all the gate lines 151. As shown in FIG. 5, the conductive pattern 183 can be pairs of conductive lines that cross the same subset of gate lines. In the alternative, the conductive pattern 183 can be pairs of conductive lines that cross different subsets of gate lines. In another alternative, the conductive pattern 183 can be one or more conductive lines that crosses all of the gate lines.

The gate pad terminal 181 and the conductive pattern 183 are formed simultaneously with the pixel electrodes (not shown) in the display region. An orientation film 190 made of polyimide is then formed on the gate pad terminal 181 and the first conductive pattern 183. The conductive pattern adheres well to the polyimide of the orientation film 190 and also adheres well to the organic insulation of the passivation layer 110. Since the first conductive pattern 183 is interposed between the passivation layer 170 and the orientation film 190 at an end portion of the orientation film 190 in a region in which a seal pattern attaches to the orientation film 190, defects resulting from poor adhesion between the passivation layer 170 and the orientation film 190 are prevented.

In addition or in the alternative, a conductive pattern can be further formed across data lines adjacent to where data pads are disposed. These features are shown in FIGS. 7 and 8.

Figure 7:
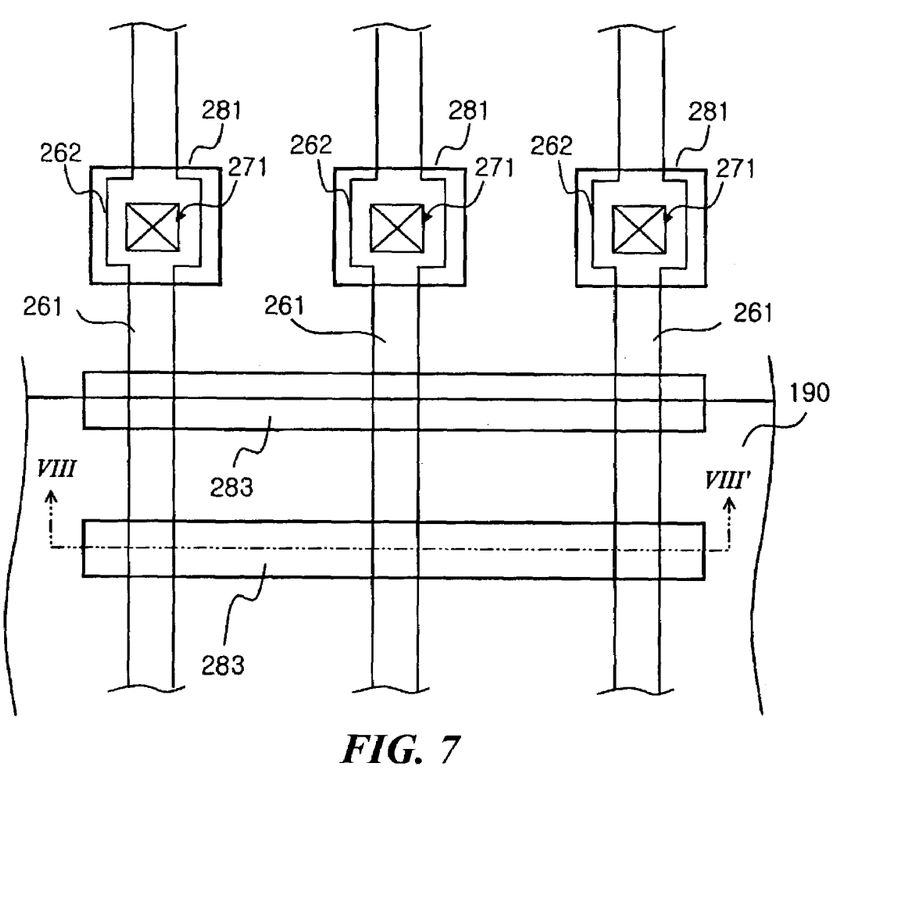
FIG. 7 is a schematic magnified plan view of the portion "D" of FIG. 4 according to an exemplary embodiment of the present invention.
Figure 8:
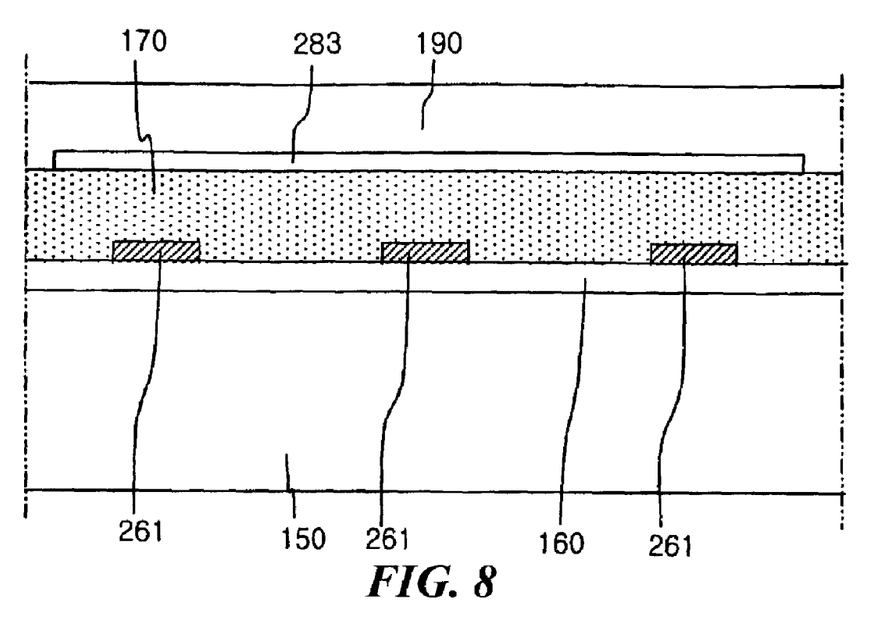
FIG. 8 is a schematic cross-sectional view taken along the line VIII-VIII' of FIG. 7.

FIG. 7 is a schematic magnified plan view of the portion "D" in FIG. 4 according to an exemplary embodiment of the present invention, and FIG. 8 is a schematic cross-sectional view taken along the line VIII-VIII' of FIG. 7.

As shown in FIGS. 7 and 8, a gate insulating layer 160 is formed on a substrate 150 and data lines 261 are formed on the gate insulating layer 160 along a second direction. Each of the data lines 261 includes a data pad 262 for applying signals. A passivation layer 170 of an organic material, such as photo-acryl, is formed over each of the data lines 261. The passivation layer 170 has a data pad contact holes 271 exposing the data pads 262 for each of the data lines 261. Data pad terminals 281 and a second conductive pattern 283 of a transparent conductive material, such as indium-tin-oxide (ITO) or indium-zinc-oxide (IZO), are then formed on the passivation layer 170. Each of the data pad terminals 281 is electrically connected to a data pad 262 through a data pad contact hole 271. The second conductive pattern 283 crosses the data lines 261 and is disposed at a position between the data pad 262 and a peripheral thin film transistor (not shown) in a display region corresponding to the first region A of FIG. 4. The data pad terminals 281 and the second conductive pattern 283 are formed simultaneously with pixel electrodes (not shown) in the display region. An orientation film 190 made of a material, such as polyimide, is formed over both the data pad terminals 281 and the second conductive pattern 283.

Similar to the first conductive pattern in FIGS. 5 and 6, since the second conductive pattern 283 is interposed between the passivation layer 170 and the orientation film 190, the adhesion of the orientation film 190 is improved.

In the above examples, since the first and second conductive patterns 183 and 283 respectively overlap the gate lines 151 and the data lines 261, a parasitic capacitance occurs. The parasitic capacitance interferes with signals by delaying the signals, which may be undesirable depending upon device design. A conductive pattern that reduces the parasitic capacitance is depicted in FIGS. 9 to 12.

Figure 9:
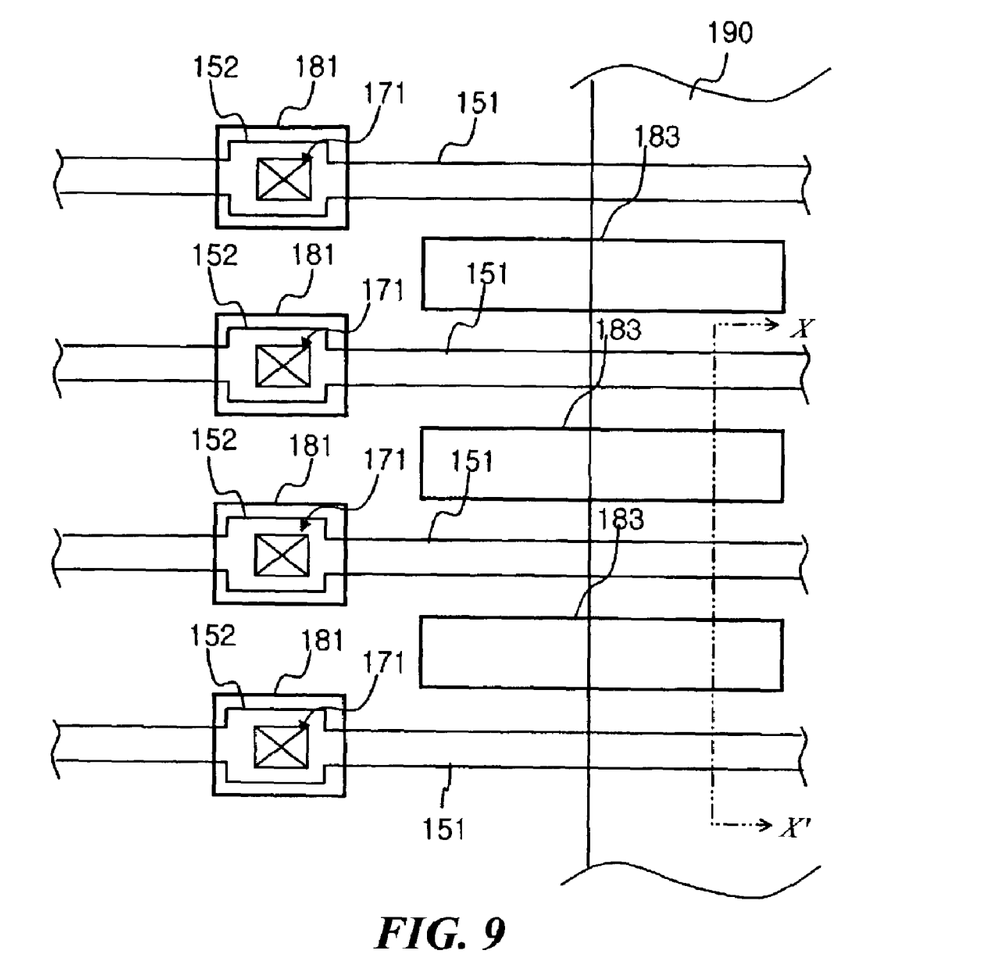
FIG. 9 is a schematic magnified plan view of the portion "C" in FIG. 4 according to another exemplary embodiment of the present invention.
Figure 10:
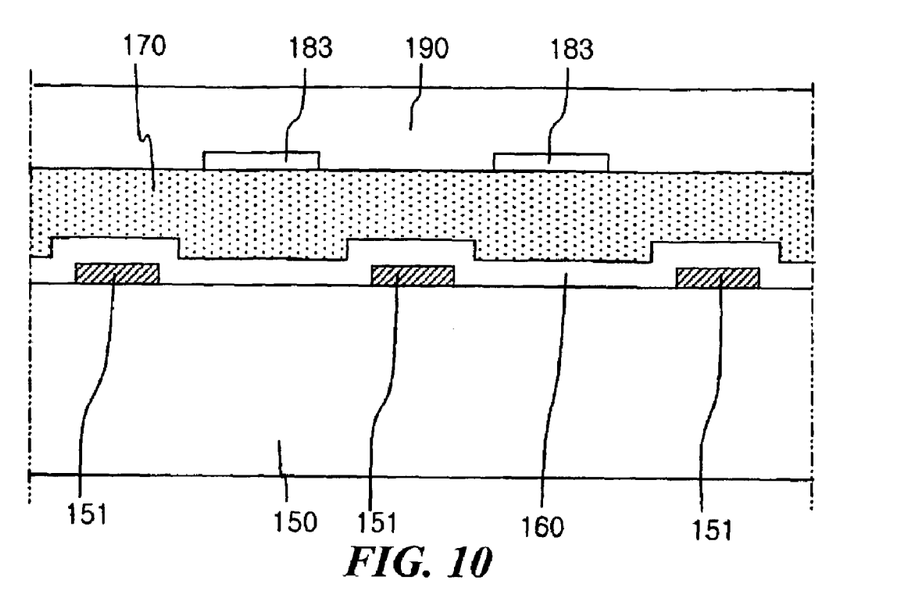
FIG. 10 is a schematic cross-sectional view taken along the line X-X' of FIG. 9.

FIG. 9 is a schematic magnified plan view of the portion "C" in FIG. 4 according to another exemplary embodiment of the present invention, and FIG. 10 is a schematic cross-sectional view taken along a line X-X' of FIG. 9.

As shown in FIGS. 9 and 10, gate lines 151 of a conductive material, such as a metal, are formed on a substrate 150 along a first direction. Each of the gate lines 151 includes a gate pad 152 for applying a signal. A gate insulating layer 160 is formed on the gate lines 151. A passivation layer 170 made of an organic material, such as photo-acryl, is formed on the gate insulating layer 160. The passivation layer 170 has gate pad contact holes 171 exposing the gate pad 152 for each of the gate lines 151. Gate pad terminals 181 made of a transparent conductive material, such as indium-tin-oxide (ITO) or indium-zinc-oxide (IZO), are formed on the passivation layer 170. Each of the gate pad terminals 181 is electrically connected to a gate pad 152 through the gate pad contact holes 171 for each of the gate lines 151, respectively. A first conductive pattern 183 of the same material as the gate pad terminal 181 is formed between adjacent gate lines 151. The first conductive pattern 183 is disposed on a portion between the gate pad 152 and a peripheral thin film transistor (not shown) and parallel to the gate lines 151. The gate pad terminal 181 and the first conductive pattern 183 are formed simultaneously with a pixel electrode (not shown) in the display region. An orientation film 190 of a material, such as polyimide, is formed on the gate pad terminals 181 and the first conductive pattern 183.

In the above embodiment, since the first conductive pattern 183 is interposed between the passivation layer 170 and the orientation film 190, adhesion of the orientation film 190 is improved. Moreover, since the first conductive pattern 183 does not overlap any of the gate lines 151, and is formed parallel to the gate lines 151 and between the adjacent gate lines 151, a parasitic capacitance between the gate lines 151 and the first conductive pattern 183 is prevented.

On the other hand, a second conductive pattern may be further formed between adjacent data lines. These features are depicted in FIGS. 11 and 12.

Figure 11:
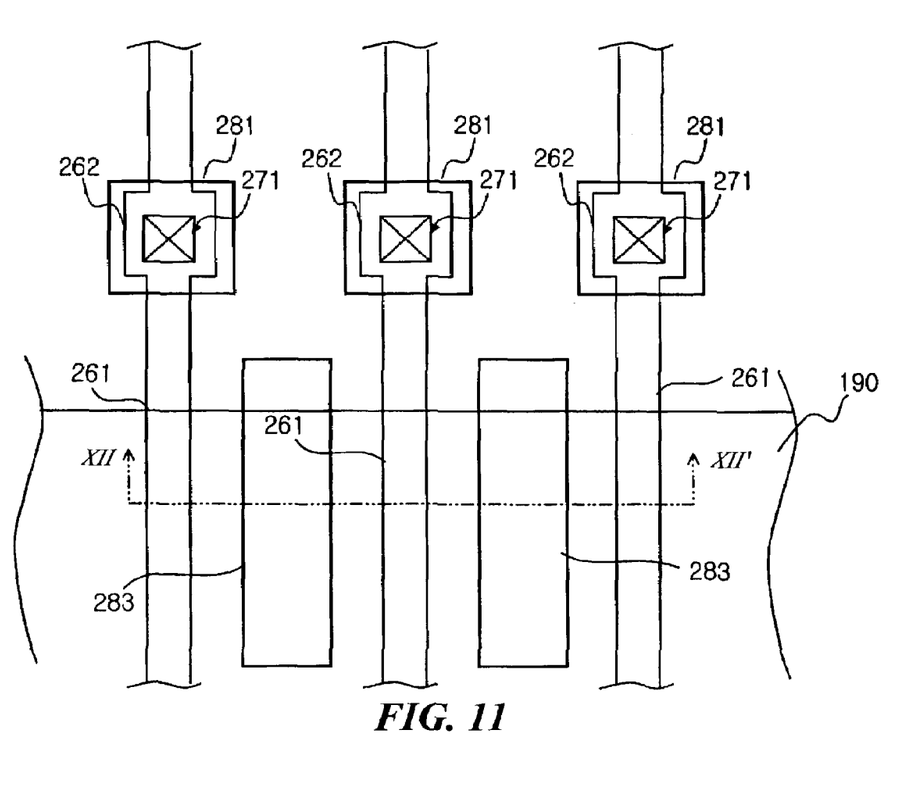
FIG. 11 is a schematic magnified plan view of the portion "D" of FIG. 4 according to another embodiment of the present invention.
Figure 12:
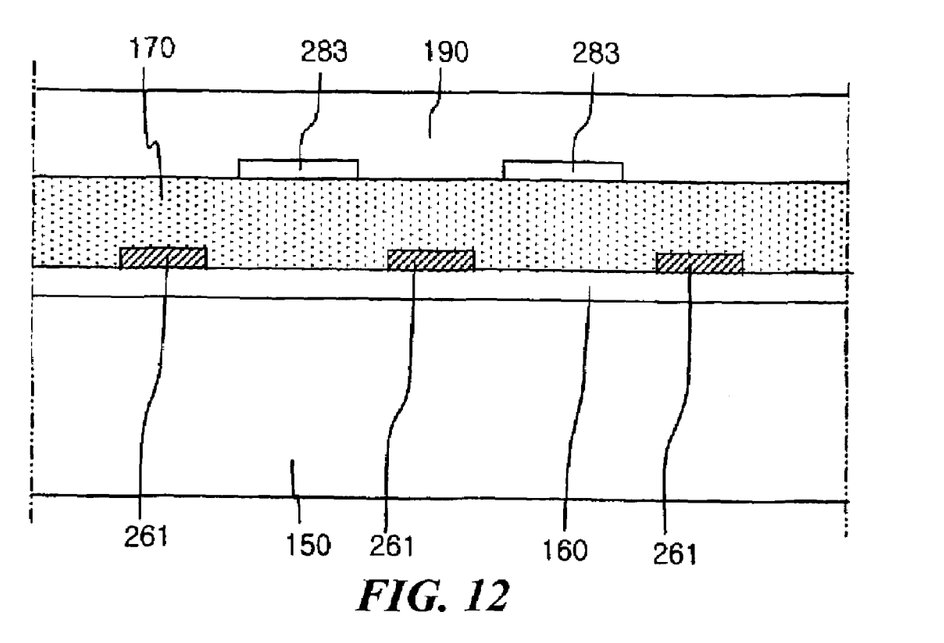
FIG. 12 is a schematic cross-sectional view taken along the line XII-XII' of FIG. 11.

FIG. 11 is a schematic magnified plan view of the portion "D" in FIG. 4 according to another embodiment of the present invention, and FIG. 12 is a schematic cross-sectional view taken along a line XII-XII' of FIG. 11.

As shown in FIGS. 11 and 12, a gate insulating layer 160 is formed on a substrate 150 and data lines 261 are formed on the gate insulating layer 160 along a second direction. Each of the data lines 261 includes a data pad 262 for applying a signal. A passivation layer 170 made of an organic material, such as photo-acryl, is formed on the data lines 261. The passivation layer 170 has a data pad contact holes 271 exposing the data pad 262 for each of the data lines 261. Data pad terminals 281 and a second conductive pattern 283 of a transparent conductive material, such as indium-tin-oxide (ITO) or indium-zinc-oxide (IZO), are formed on the passivation layer 170. Each of the data pad terminals 281 is electrically connected to the data pad 262 through data pad contact holes 271 for each of the data lines 261, respectively. The second conductive pattern 283 is formed between adjacent data lines 261. Moreover, the second conductive pattern 283 is disposed on a portion between the data pad 262 and a peripheral thin film transistor (not shown) and parallel to the data lines 261. The data pad terminals 281 and the second conductive pattern 283 are formed simultaneously with pixel electrodes (not shown) in the display region. An orientation film 190 of a material, such as polyimide, is formed on the data pad terminals 281 and the second conductive pattern 283.

Similar to the first conductive pattern in FIGS. 9 and 10, since the second conductive pattern 283 is interposed between the passivation layer 170 and the orientation film 190, adhesion of the orientation film 190 is improved without an additional process. Moreover, since the second conductive pattern 283 does not overlap any of the data lines 261, and is formed parallel to the data line 261 and just between the adjacent data lines 261, a parasitic capacitance between the data line 261 and the second conductive pattern 283 is prevented.

In the present example, a conductive pattern is formed between adjacent gate lines and between adjacent data lines at the same time pixel electrodes are formed. Since the conductive pattern is interposed between a passivation layer and an orientation film, there is good adhesion between the passivation layer and the orientation film through the conductive pattern. Moreover, since the conductive pattern does not overlap the gate and data lines, parasitic capacitances between the gate lines and the conductive pattern and between the data lines and the conductive pattern are reduced or substantially eliminated such that a signal delay is prevented.

It will be apparent to those skilled in the art that various modifications and variations can be made in the organic electroluminescent display of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:

a plurality of gate lines on a substrate having a display region and a peripheral region, each of the gate lines having a gate pad disposed in the peripheral region at one end of the gate line;

a plurality of data lines crossing the gate lines, wherein each of the data lines includes a data pad disposed in the peripheral region at one end of the data line;

a plurality of thin film transistors, each disposed at a crossing of the gate lines and the data lines, wherein the thin film transistors are in the display region;

a passivation layer over the gate lines and the data lines;

a pixel electrode on the passivation layer in the display region;

a first conductive pattern and a second conductive pattern that are both in a same layer on the passivation layer in the non-display region; and an orientation film on the first conductive pattern, wherein the first conductive pattern is disposed between the gate pads and the display region, and the second conductive pattern is disposed between the data pads and the display region, and wherein at least two gate lines are adjacent to and parallel to each other, and the first conductive pattern is formed between the adjacent gate lines and parallel to the adjacent gate lines.

2. The substrate according to claim 1, wherein a portion of the orientation film is disposed over the second conductive pattern.

3. The substrate according to claim 1, wherein at least two data lines are adjacent to and parallel to each other, and the second conductive pattern is formed between the adjacent data lines and parallel to the adjacent data lines.

4. The substrate according to claim 1, wherein the second conductive pattern is disposed between the data pads and an outer thin film transistor of the display region.

5. The substrate according to claim 1, wherein the first and second conductive patterns are made of the same material as the pixel electrode.

6. The substrate according to claim 5, wherein the pixel electrode and the first and second conductive patterns include a transparent conductive material.

7. The substrate according to claim 6, wherein the transparent conductive material includes one of indium-tin-oxide (ITO) and indium-zinc-oxide (IZO).

8. The substrate according to claim 1, wherein the passivation layer includes polyimide.

9. A fabricating method of an array substrate for a liquid crystal display device, comprising:

forming a plurality of gate lines on a substrate having a display region and a non-display region, wherein the non-display region is about a periphery of the display region and each of the gate lines includes a gate pad disposed in the non-display region at one end of the gate line;

forming a plurality of data lines crossing the plurality of gate lines, wherein the each of the data lines includes a data pad disposed in the non-display region at one end of the data line;

forming a plurality of thin film transistors, each at a crossing of the gate lines and the data lines;

forming a passivation layer over the gate lines and the data lines;

forming a pixel electrode on the passivation layer in the display region;

forming a first conductive pattern and a second conductive pattern that are both in a same layer on the passivation layer in the non-display region, wherein the second conductive pattern is disposed between the data pad and the display region, wherein at least two of the data lines are adjacent and parallel to each other, and the second conductive pattern is formed between the adjacent data lines and parallel to the adjacent data lines; and forming an orientation film on the first conductive pattern.

10. The method according to claim 9, wherein the pixel electrode and the first conductive pattern are formed at the same time.

11. The method according to claim 9, wherein at least two of the gate lines are adjacent and parallel to each other, and the first conductive pattern is formed between the adjacent gate lines and parallel to the adjacent gate lines.

12. The method according to claim 9, wherein the pixel electrode and the first and second conductive patterns are formed at the same time.

13. The method according to claim 9, wherein the pixel electrode and the first and second conductive patterns include a transparent conductive material.

14. The method according to claim 13, wherein the transparent conductive material includes one of indium-tin-oxide (ITO) and indium-zinc-oxide (IZO).

15. The method according to claim 9, wherein the passivation layer includes polyimide.

16. An array substrate for a liquid crystal display device, comprising:
a gate line on a substrate having a display region and a non-display region, wherein the non-display region is about a periphery of the display region and the gate line includes a gate pad disposed in the non-display region at one end of the gate line;
a data line crossing the gate line, wherein the data line includes a data pad disposed in the non-display region at one end of the data line;
a passivation layer over the gate line and the data line;
a first conductive pattern on and in contact with the passivation layer in the non-display region, wherein the first conductive pattern is electrically floating;
a second conductive pattern on and in contact with the passivation layer, the second conductive pattern being disposed between the data pad and a display region, wherein the second conductive pattern is electrically floating; and
an orientation film on the first conductive pattern.

17. The substrate according to claim 16, wherein a thin film transistor connected to the gate line and data line is in a display region of the liquid crystal display device, and the gate pad and data pad are in a peripheral region about the display region.

18. The substrate according to claim 16, wherein the first conductive pattern is disposed between the gate pad and an outer thin film transistor of a display region.

19. The substrate according to claim 16, wherein the second conductive pattern being disposed between the data pad and a display region.

20. An array substrate for a liquid crystal display device, comprising:
a display region and a non-display region on the substrate, wherein the non-display region is about a periphery of the display region;
at least two gate lines adjacent to and parallel to each other, wherein each of the gate lines includes a gate pad disposed in the non-display region;
a data line crossing the at least two gate lines, wherein the data line includes a data pad disposed in the non-display;
a passivation layer over the gate line and the data line;
a first conductive pattern on the passivation layer that is in the non-display region and is only in areas between the at least two gate lines and is parallel to the gate lines; and
an orientation film on the first conductive pattern.

21. A fabricating method of a liquid crystal display device on an array substrate having a non-display region formed about a periphery of a display region, comprising:
forming at least two gate lines adjacent to and parallel to each other, wherein each of the gate lines includes a gate pad disposed in the non-display region;
forming a data line crossing the at least two gate lines, wherein the data line includes a data pad disposed in the non-display;
forming a passivation layer over the gate line and the data line;
forming a first conductive pattern on the passivation layer that is in the non-display region and is only in areas between the at least two gate lines and is parallel to the gate lines; and
forming an orientation film on the first conductive pattern.

22. An array substrate for a liquid crystal display device, comprising:
at least two gate lines on a substrate having a display region and a non-display region, wherein the non-display region is about a periphery of the display region and each of the at least two gate lines includes a gate pad disposed in the non-display region at one end of the gate line;
at least two data lines crossing the at least two gate lines, wherein each of the at least two data lines includes a data pad disposed in the non-display region at one end of the data line;
a thin film transistor disposed at a crossing of the at least two gate lines and the at least two data lines;
a passivation layer over the at least two gate lines and the at least two data lines;
a pixel electrode on the passivation layer in the display region;
a first conductive pattern and a second conductive pattern on the passivation layer in the non-display region; and
an orientation film on the first conductive pattern, wherein the second conductive pattern is formed between the at least two data lines and parallel to the at least two data lines.

23. A liquid crystal display device, comprising:
a substrate having a display region and a non-display region, wherein the non-display region is about a periphery of the display region;
a gate line on the substrate, the gate line having a gate pad disposed in the non-display region at one end of the gate line;
a data line crossing the gate line, the data line having a data pad disposed in the non-display region at one end of the data line;
a thin film transistor connected to the gate line and the data line;
a passivation layer disposed on the gate line and the data line;
a pixel electrode on the passivation layer in the display region;
a first conductive pattern and a second conductive pattern that are both in a same layer on the passivation layer in the non-display region, wherein the first and second conductive patterns are electrically floating; and
an orientation film on the first conductive pattern.

* * * * *